United States Patent
Vanover et al.

(10) Patent No.: US 9,505,992 B2
(45) Date of Patent: Nov. 29, 2016

(54) METHOD OF REMOVING PHASE SEPARATED FUEL FROM UNDERGROUND AND ABOVE-GROUND STORAGE TANKS

(71) Applicants: Michael Vanover, Warren, IN (US); Greggory Vanover, Warren, IN (US)

(72) Inventors: Michael Vanover, Warren, IN (US); Greggory Vanover, Warren, IN (US)

( * ) Notice: Subject to any disclaimer, the term of this patent is extended or adjusted under 35 U.S.C. 154(b) by 0 days.

(21) Appl. No.: 14/610,580

(22) Filed: Jan. 30, 2015

(65) Prior Publication Data
US 2015/0218473 A1    Aug. 6, 2015

Related U.S. Application Data

(63) Continuation-in-part of application No. 14/032,343, filed on Sep. 20, 2013, now abandoned.

(51) Int. Cl.
| | |
|---|---|
| *C10G 33/00* | (2006.01) |
| *C10G 33/06* | (2006.01) |
| *B60K 15/00* | (2006.01) |
| *B60K 15/03* | (2006.01) |

(52) U.S. Cl.
CPC .......... *C10G 33/06* (2013.01); *B60K 15/00* (2013.01); *B60K 15/03* (2013.01)

(58) Field of Classification Search
CPC ....... C10G 33/06; B60K 15/00; B60K 15/03
See application file for complete search history.

(56) References Cited

U.S. PATENT DOCUMENTS

| | | | | |
|---|---|---|---|---|
| 3,595,392 | A * | 7/1971 | Markel | ............ B63B 35/32 210/242.1 |
| 3,660,285 | A * | 5/1972 | Markel | ........ B01D 17/0214 210/800 |
| 4,296,723 | A * | 10/1981 | Aldrich | ........ F02M 37/0047 123/25 R |
| 5,705,056 | A * | 1/1998 | Scragg | ........ B01D 17/0208 137/192 |

* cited by examiner

*Primary Examiner* — Cephia D Toomer
(74) *Attorney, Agent, or Firm* — Jacque R. Wilson; Carson Boxberger LLP

(57) ABSTRACT

A method of removing water from phase separated fuel in a fluid reservoir, said method comprising the steps of: identifying layers of fluid within the reservoir; determining the heights of the respective fluid layers within said reservoir; providing a vacuum and a first suction tube, said vacuum and said first suction tube providing a first volumetric flow rate; inserting the first suction tube into said fluid reservoir; removing a first fluid layer; replacing said first suction tube with a second suction tube, said second suction tube having a greater cross-sectional area than said first suction tube such that said vacuum and said second suction tube have a second volumetric flow rate; inserting said second suction tube into said fluid reservoir; removing a second fluid from said reservoir; and sending said second fluid through a filtration system.

4 Claims, 1 Drawing Sheet

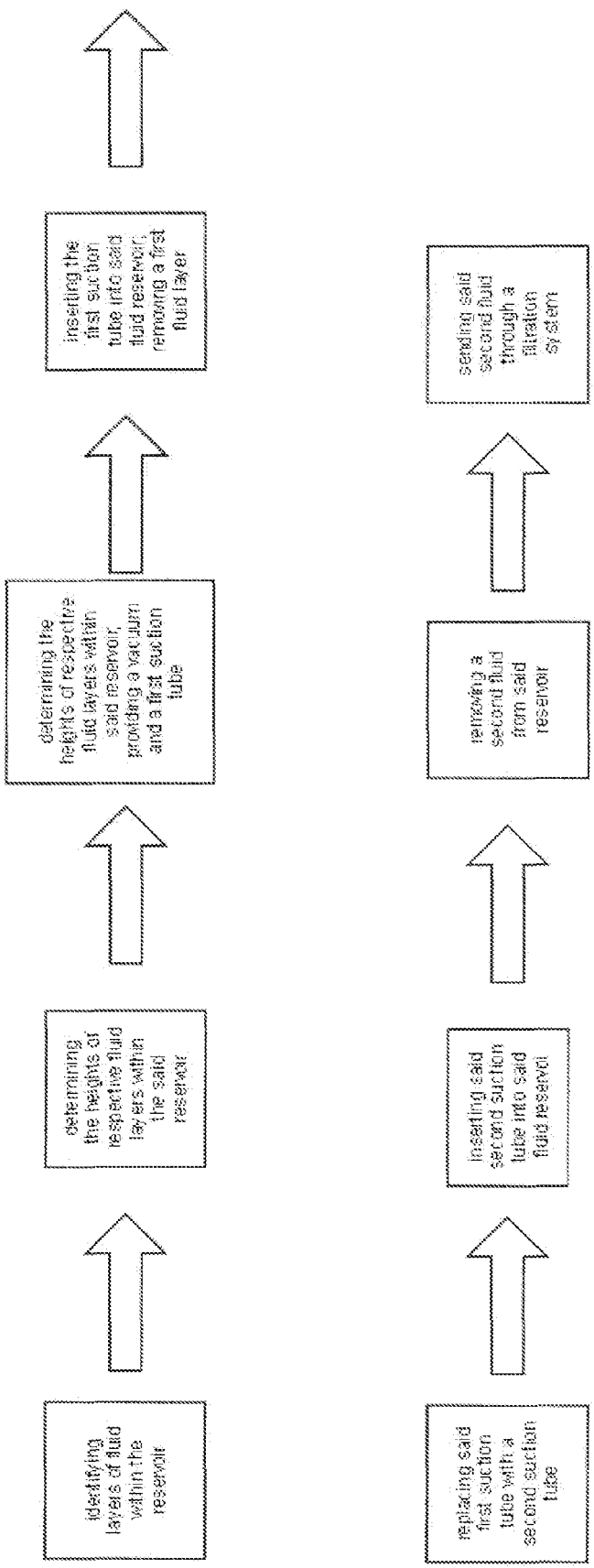

METHOD OF REMOVING PHASE SEPARATED FUEL FROM UNDERGROUND AND ABOVE-GROUND STORAGE TANKS

CROSS REFERENCE TO RELATED APPLICATIONS

The present application is a continuation-in-part to U.S. patent application Ser. No. 14/032,343, filed Sep. 20, 2013 entitled Phase Separation Removal from Underground and Above-Ground Storage Tanks.

BACKGROUND

1. Field of the Art

The present invention relates to phase separation in gasoline containing ethanol. More specifically, the present invention relates to a method of treating phase separation in gasoline.

Phase Separation describes what happens to gasoline containing ethanol when water is present. When gasoline containing even small amounts of ethanol comes in contact with water, the ethanol absorbs some or all of that water. When it reaches a saturation point, the ethanol and water phase separate, actually coming out of solution and forming two or three distinct layers in the tank. Phase Separation is also temperature dependent. For example, E-10 can hold approximately 0.05% water at 60° F.

Phase separation can happen in an underground or above-ground storage tank, a vehicle tank, a boat tank, and even in the gas can in your garage. When this happens, serious and even catastrophic engine problems can occur without warning. When this phase separation occurs, an upper layer of gasoline exists with a milky layer of ethanol on top and water below it, and then in many cases a third layer of just water at the bottom.

If this happens, many problems with running the engine can occur. If the fuel tank pick-up tube is in the water layer, most likely the engine will fail to start. If the engine is running and suddenly draws water engine damage may occur from thermal shock or hydro-lock. If the pick-up tube draws the ethanol-water mixture or just ethanol, the engine may operate in an extreme lean condition, which can cause significant damage or even catastrophic failure. If the pick-up tube draws the gasoline, it will operate very poorly due to a lower octane level that is the result of no longer having the Ethanol in the fuel.

Ethanol is a strong, aggressive solvent, and often causes problems with rubber hoses, o-rings, seals, and gaskets. These problems are worse during extended storage when significant deterioration will take place. Hoses delaminate, o-rings soften and break down, and fuel system components made from certain types of plastics either soften or become hard and brittle, eventually failing. Fuel system components made from brass, copper, and aluminum oxidize to the point of failure.

Operators of boats with fiberglass fuel tanks built before 1993 can have actual structural failure as the ethanol dissolves some of the materials the tanks are made from. The tanks can become so weakened that they can fail. Alternatively, dissolved material from the fiberglass tank is carried through the fuel system and causes damage to carburetors, fuel injectors, and combustion chambers. This material can be nearly impossible to remove without destroying the affected parts.

Two-Cycle engines have a special problem with ethanol blended fuels. Two-Cycle engines function because the oil added to the fuel bonds to the engines metal surfaces and provides barrier lubrication to all the parts requiring lubrication. When Ethanol is added to the gasoline, it displaces the oil and forms a primary bond with the metal surfaces. This bond provides virtually no lubrication and can result in significantly increased wear and even catastrophic failure in a very short amount of time.

Gasohol, E-10, E-20, and E-85 are the terms that refer to gasoline containing Ethanol. For example the most common fuel available today is E10. E-10 is 10% Ethanol and 90% gasoline, while E-85 is 85% Ethanol and 15% gasoline (Note: E-85 is actually E-70 in the winter in cold weather (Northern Tier) states.

Ethanol has less energy (as measure in Btu's—British Thermal Units) per gallon than does regular unleaded gasoline. This means that the more Ethanol found in fuel the worse your fuel economy will be. You use more gallons of fuel containing Ethanol to go fewer miles.

The use of Ethanol was promoted and legislated by the Energy Policy Act of 1992. It reduces our reliance on foreign oil, is good for the environment, improves air emissions, and can improve octane levels. It is sold in two main forms—E10 and E85. It can be used in any vehicle or small engine that uses conventional gasoline fuels, and is used as a fuel extender and octane improver with blends that are usually 10% ethanol and 90% unleaded gasoline.

There is a growing shift to E85, which is usually in concentrations of 75-85% ethanol and 25-15% unleaded gasoline. While ethanol promotes more complete combustion, it has a lower energy ratio than gas, and it decreases fuel economy by 1-3%. It acts as a solvent, and is very soluble in water. However, E85 can only be used in "flex-vehicles" that are designed and manufactured to use E85.

Phase separation causes two liquid layers to form in the tank. The lower layer contains water and ethanol. The upper layer is the petroleum fuel with a small amount of ethanol. When phase separation occurs, engines receive a blend of ethanol and water that will adversely affect vehicle performance potentially stranding motorists at the pump. As the problem of phase separation is nearly unavoidable, a need exists for a reliable, inexpensive, and efficient method for removing phase separated fuel from fluid reservoirs.

2. Description of the Prior Art

Unfortunately, the known prior art, described below, does not address the need for a reliable, inexpensive, and efficient method for removing phase separated fuel from fluid reservoirs.

U.S. Pat. No. 4,261,702 discloses a process for preparation of gasohol in which gasoline and aqueous alcohol, such as 95 w % ethanol, are mixed to form wet two-phase gasahol (including a hydrocarbon phase and a water phase); and the water-phase is separated and reacted with a ketal, acetal, or orthoester to form a dry composition which is blended back into the gasoline-phase to form a dry gasahol.

U.S. Pat. No. 4,328,004 discloses a stabilized composition of matter comprising a fuel oil, such as gasoline, ethanol, small amounts of water and a stabilizing amount of an additive which is substantially insoluble in water, but which is soluble in ethyl alcohol and gasoline and is effective to prevent the separation of the gasoline-ethyl alcohol solution into two distinct phases; said additive being n-hexylalcohol, hereinafter, n-hexanol. The invention also includes a method for stabilizing gasoline, that is, for preventing or retarding the phase separation of gasoline-ethanol mixtures in the presence of small amounts of water, and this being the case when the temperature of the gasoline-ethanol mixture has been reduced to below 20° F.

U.S. Pat. No. 4,402,296 discloses a method and system for supplying an internal combustion engine with a plurality of fuels wherein a first fuel source 10 which is conventional lead-free gasoline is provided, and a second source of fuel 12 which consists of from 180 to 190 proof ethanol is provided as a second fuel source. The fuels are maintained separately and are fed to the intake manifold 18 of the internal combustion engines separately and simultaneously via injection valves 34 and 36. Upon injection to the heated intake manifold, the fuels are vaporized and mixed in the vapor phase prior to combustion in the combustion chambers 32. An electric coil 46 is provided for heating the alcohol fuel and enhancing vaporization. The method also includes injecting water vapor into the combustion chamber with the gasoline and alcohol in the ratio of 0.5 to 2.5 percent and of including either Diethanolaminebenzoate, Dimethylbenzalkoniumchloride, Dicyclohexylaminenitrite, and/or Mercaptobenzothiazole as corrosion inhibitors.

U.S. Pat. No. 4,539,107 discloses a phase separation detecting filter for alternate use in filtering methanol-gasoline and ethanol-gasoline blends and sensing phase separation in either blend. The filter includes a composite filter media including a mechanical filter, a methanol sensing material and an ethanol sensing material. Both of the sensing materials are responsive to unduly high levels of the material being sensed in a corresponding blend and swelling to a substantially increased volume. The same are contained in a flow path such as to substantially block the flow path upon swelling of either or both of the sensing materials to thereby provide an indication of phase separation.

U.S. Pat. No. 5,028,240 discloses a process for producing, from a dilute aqueous solution of a lower (C1-C5) alcohol, a concentrated liquid solution of the alcohol in an aromatic organic solvent is disclosed. Most of the water is removed from the dilute aqueous solution of alcohol by chilling sufficiently to form ice crystals. Simultaneously, the remaining liquid is extracted at substantially the same low temperature with a liquid organic solvent that is substantially immiscible in aqueous liquids and has an affinity for the alcohol at that temperature, causing the alcohol to transfer to the organic phase. After separating the organic liquid from the ice crystals, the organic liquid can be distilled to enrich the concentration of alcohol therein. Ethanol so separated from water and concentrated in an organic solvent such as toluene is useful as an anti-knock additive for gasoline.

U.S. Pat. No. 6,389,814 discloses a low or no pollution engine is provided for delivering power for vehicles or other power applications. The engine has an air inlet which collects air from a surrounding environment. At least a portion of the nitrogen in the air is removed using a technique such as liquefaction, pressure swing adsorption or membrane based air separation. The remaining gas is primarily oxygen, which is then compressed and routed to a gas generator. The gas generator has an igniter and inputs for the high pressure oxygen and a high pressure hydrogen-containing fuel, such as hydrogen, methane or a light alcohol. The fuel and oxygen are combusted within the gas generator, forming water and carbon dioxide with carbon containing fuels. Water is also delivered into the gas generator to control the temperature of the combustion products. The combustion products are then expanded through a power generating device, such as a turbine or piston expander to deliver output power for operation of a vehicle or other power uses. The combustion products, steam and, with carbon containing fuels, carbon dioxide, are then passed through a condenser where the steam is condensed and the carbon dioxide is collected or discharged. A portion of the water is collected for further processing and use and the remainder is routed back to the gas generator. The carbon dioxide is compressed and cooled so that it is in a liquid phase or super critical state. The dense phase carbon dioxide is then further pressurized to a pressure matching a pressure, less hydrostatic head, existing deep within a porous geological formation, a deep aquifer, a deep ocean location or other terrestrial formation from which return of the CO2 into the atmosphere is inhibited.

U.S. Pat. No. 6,645,373 discloses a dual element water sensing fuel dispenser filter. The dual element water sensing fuel dispenser filter comprises a housing with an open end. An end plate is positioned in the open end. Contained within the housing is a filter element assembly that includes a first filter portion and a second filter portion. The first filter portion is formed from an annular pleated paper filter media comprised of two layers with a water sensing chemical there between. Disposed within the pleated paper filter media are a pair of generally concentric perforate cores containing a chemical fill there between. The pleated paper filter media will remove particulate matter from the fuel, whether the fuel be gasoline or an alcohol-gasoline blended fuel. The water sensing chemical in the pleated paper filter media will sense and remove water from the gasoline fuel. The chemical fill will sense the phase separation in the alcohol-gasoline blended fuel and will swell and gell to preclude water from passing through the filter.

U.S. Pat. No. 8,344,189 discloses a method for recovery of fuel-grade ethanol from dilute aqueous ethanol feed in a continuous or batch-wise process includes providing a feed tank containing a dilute aqueous ethanol liquid phase and a vapor phase, removing a portion of the vapor phase from the tank and circulating it through a membrane contactor having an inner lumen and an outer shell, recovering from the membrane contactor a feed phase substantially reduced in ethanol and a solvent phase substantially enriched in ethanol, separating an enriched ethanol phase from the solvent phase, and removing a substantial amount of water from the enriched ethanol phase to produce a fuel-grade ethanol stream. A Venturi nozzle may be used in lieu of the membrane contactor.

U.S. Pat. No. 8,642,108 discloses a method for preparing fatty acid esters particularly used as bio-diesel fuel from whole oleaginous grains, characterized in that it comprises the following successive steps: preheating the whole non-husked grains; flattening the oleaginous grains; drying the flattened grains in order to obtain a water content and a volatile material content between 0.5 and 2.5%, and preferably between 1.5% and 2%; performing a transesterification by contacting the dried, flattened grains with an alcoholic medium in the presence of a catalyst; separating the liquid and solid phases resulting from the transesterification; neutralizing the liquid phase from step d); and removing the alcohol and separating the glycerine from the fatty acid esters.

U.S. Pat. No. 8,815,084 discloses a process for the removal of sodium from sodium-containing heavy fractions from a process for the combined production of styrene and propylene oxide comprising admixing an aqueous solution of an organic carboxylic acid to the heavy fraction at a temperature comprised between 20° C. and 100° C., and separation of the organic phase from the aqueous phase, wherein the organic phase contains less than 0.5% by weight of polymeric solids. The obtained organic phase has low viscosity and ash content and can be used directly as a fuel.

U.S. Pat. No. 8,878,682 discloses a system and method for detecting phase separation in storage tanks is provided.

At least one float has a density calibrated to detect a density differential among surrounding fluids. The float is buoyant on a relatively more dense lower layer of fluid such as phase separated fuel or pure water, while remaining submerged in a relatively less dense upper layer of fluid such as a gasoline/ethanol blend. A detection device sends a signal when the float rises or falls above or below a preset acceptable level.

SUMMARY

In view of the above stated prior art, there remains a need for an inexpensive, reliable, and efficient method for removing phase separated fuel from fluid reservoirs. the present addresses these needs by providing a method of removing water from phase separated fuel in a fluid reservoir, said method comprising the steps of: identifying layers of fluid within said reservoir; determining the heights of the respective fluid layers within the reservoir; providing a vacuum and a first suction tube, said vacuum and said first suction tube providing a first volumetric flow rate; inserting the first suction tube into said fluid reservoir; removing a first fluid layer; replacing said first suction tube with a second suction tube, said second suction tube having a greater cross-sectional area than said first suction tube such that said vacuum and said second suction tube have a second volumetric flow rate; inserting said second suction tube into a second fluid layer; removing a fluid from said reservoir; and sending said second fluid through a filtration system.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

In the drawings:

FIG. 1 shows a block diagram of the steps of the present inventions.

DETAILED DESCRIPTION OF THE EMBODIMENTS

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Thus, all of the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations. Moreover, in the present description, the terms "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention comprises a method of removing an ethanol and water mixture from above ground and underground storage tanks without agitating the fuel thereby preventing any further damage to the already impacted petroleum product.

The water levels and phase separation levels of a fuel within a fluid reservoir are assessed using a tank measuring stick coated with water finding paste, for example SAGEL, or GASOLA. The levels of various fluids within the reservoir are indicated by color changes of the paste. A first polyvinyl chloride ("PVC") suction tube, preferably having a one inch diameter, is lowered into the tank bottom. Those of skill in the art will appreciate that other polymer or unreactive materials may be used with the present invention.

The first fluid tube is attached at one end to a vacuum apparatus. The first fluid, a water alcohol mix, from the phase separated fuel is drawn through the first fluid suction tube using the vacuum. The water is stripped from the alcohol gas mix. The first fluid is preferably drawn through the first tube at a relatively low volumetric flow rate to avoid disturbing the phase separated layers. Once the first fluid, usually water, is evacuated from the fluid reservoir, the next fluid, commonly a predominantly ethanol phase, is drawn up next.

Once it is verified that the water level have been sufficiently reduced, the first suction tube is replaced with a larger PVC tube, preferably having a two inches diameter. Due to the greater diameter of the second tube, the same vacuum device can be used to generate a higher volumetric flow rate of a fluid as it is removed from the tank. Additionally, the larger PVC tube facilitates the removal of any particulate matter in the second fluid. After all water is been removed, the remainder of the second phase fluid is sent through a filtration system having various water removing elements to remove any remaining particulate matter. There is ongoing visual confirmation of the tank cleaning process generally including an ethanol field test to alert users of the present system to a problem.

The above-described embodiments are merely exemplary illustrations set forth for a clear understanding of the principles of the invention. Many variations, combinations, modifications, or equivalents may be substituted for elements thereof without departing from the scope of the invention. It should be understood, therefore, that the above description is of an exemplary embodiment of the invention and included for illustrative purposes only. The description of the exemplary embodiment is not meant to be limiting of the invention. A person of ordinary skill in the field of the invention or the relevant technical art will understand that variations of the invention are included within the scope of the claims.

The invention claimed is:

1. A method of removing water from a phase separated fluid in a fluid storage reservoir where said fluid includes at least a water layer and a fuel layer, said method comprising the steps of: identifying layers of fluid within the reservoir, wherein said layer of fluid include a water layer and a fuel layer; determining the vertical location of respective fluid layers within the said reservoir; providing a vacuum and a first suction tube, said vacuum and said first suction tube having a first volumetric flow rate; inserting the first suction tube into said fluid reservoir; removing said water fluid layer; replacing said first suction tube with a second suction tube, said vacuum and said second suction tube having a second volumetric flow rate; inserting said second suction tube into said fluid reservoir; removing said fuel fluid layer from said reservoir; and sending said fuel fluid layer through a filtration system.

2. The method of claim 1, wherein said second tube comprises a greater cross-sectional area than said first tube.

3. The method of claim 1, wherein said step of determining the vertical location of said fluid layers comprises using a tank measuring stick having a water finding paste.

4. The method of claim 1, wherein said first and second tubes comprise poly vinyl chloride.

* * * * *